2,900,267

MODIFIED ANIMAL GLUE AND METHOD OF PREPARATION

Edward F. Cavanaugh, Wilmette, and Havard L. Keil, Clarendon Hills, Ill., assignors to Armour and Company, Chicago, Ill., a corporation of Illinois No Drawing. Application October 17, 1956
Serial No. 616,381

20 Claims. (Cl. 106—135)

This invention relates to modified animal glue and the method of preparation thereof. More particularly, this invention is concerned with an esterified animal glue product which is characterized as compared with its properties prior to esterification by a reduced gelling temperature, increased stability of viscosity, increased solubility in water, and appreciable solubility in polar organic solvents.

The present application is a continuation-in-part of our co-pending application Serial No. 388,458, filed October 26, 1953, and now abandoned, which is a continuation-in-part of our then co-pending application Serial No. 230,836, filed June 9, 1951, which is now abandoned.

Animal glue, which is produced commercially mainly from animal hides and bones, is a well known and widely used adhesive. It is frequently marketed as a dry powder or granules. For ordinary use, the dry glue is dissolved in water, which usually requires soaking of the glue in the water and the application of heat because of the limited solubility of the glue. This difficulty of getting the glue into suitable aqueous solution for use has led to the marketing of ready-made liquid glue.

Another problem encountered with the use of animal glue is due to the rather high gelling temperature of the glue in aqueous solutions which contain a sufficient amount of glue to make them useful for adhesive purposes. For example, solubilized dry glues may gel at temperatures ranging from about 31 to 35° C., and even the ready-made liquid glues will usually gel at around ordinary room temperature. Therefore, it is necessary to continually heat the glue solutions while they are being used to keep them in liquid condition. While the gelling of the glue is primarily a function of temperature and is reversible, nevertheless it is undesirable from a practical standpoint to continue to use the glue until it gels, since it becomes unmanageably viscous and sticky as it gels, and hence cannot be readily applied or spread upon work surfaces.

Ordinary animal glue as it is used today is not appreciably soluble in any organic solvent, and this considerably limits the utility of the glue. Further, even in water it is difficult to dissolve a sufficient amount of the glue, and the industry has long sought animal glue solutions of higher glue solids content. It has also been found to be important to produce animal glue solutions which exhibit a high degree of viscosity without tending to gel and even though the glue is well above its gelling temperature.

It is therefore a general object of this invention to provide a chemically modified animal glue which can be used at room temperature and below, thereby eliminating the necessity of continually heating the glue. Another important object of the invention is to provide a modified animal glue which is readily soluble in water at room temperature or below, and which is generally more soluble in water than previously known animal glues of comparable gel strength and viscosity. A further object is to provide a modified animal glue which is soluble in a wide range of organic solvents. Another object is to provide a modified animal glue having very stable viscosity. A still further object is to provide an animal glue of the character described without sacrificing any of the other desirable qualities of animal glues, such as good viscosity, high bond strength, high solids content, etc. Further objects and advantages will become apparent as the specification proceeds.

This invention is based in part on the discovery that animal glue can be chamically modified to produce a glue substantially achieving the above objectives by reacting an aqueous non-alkaline solution of animal glue with an alkylene oxide. In this way the gel temperature and solubility properties of the glue in both water and organic solvents can be favorably modified.

In practicing the method of this invention, an aqueous solution of animal glue is formed at a pH at which the carboxyl groups of the glue are in their free acid form as distinguished from their salt form. An alkylene oxide is then introduced into the solution and maintained in contact with the glue for a time sufficient to lower the gel temperature of the glue. Under these conditions an esterification reaction occurs. When the carboxyl groups of the glue are in their free acid form they can combine with the alkylene oxide to form ester derivatives of the glue. On the other hand, if the carboxyl groups were in their salt form, as would be the case when a base such as sodium hydroxide is present in the reaction medium, no significant esterification can take place. It can therefore be seen that the method of this invention is characterized by reacting animal glue containing carboxyl groups in their free acid form under non-alkaline conditions with an alkylene oxide to esterify the glue.

The alkylene oxides suitable for use in practicing this invention are characterized by containing an epoxide group, that is, a group in which two adjacent single bonded carbon atoms are each bonded to the same oxygen atom. The carbon atoms of the epoxide group can be bonded to other groups such as hydrogen, and hydrocarbon groups like alkyl and aryl groups. The preferred reagent is styrene oxide, but for many purposes other alkylene oxides can be employed, such as ethylene oxide, propylene oxide, and butylene oxide.

The preferred method of carrying out the desired esterification is to dissolve the animal glue in water and to employ this aqueous solution as the reaction medium. As already indicated, the aqueous solution of animal glue should be at a non-alkaline pH. Best results are achieved when the pH at the start of the reaction is below about pH 6.5. The reaction can also be carried out at a somewhat higher pH by dissolving a non-alkaline animal glue in water and allowing the solution to assume the pH of the glue, which may approach neutrality. The alkylene oxide is then introduced into the solution and maintained therein by any suitable method for achieving intimate contact of the alkylene oxide with the dissolved glue. As the reaction proceeds, there will be a pH shift to the alkaline side, indicating that ester linkages are being formed with a resulting decrease in the acidity of the glue. If the pH of the final product is adjusted to the acid side, preferably in the range of pH 4 to pH 6, the stability of the viscosity of the final liquid glue product is markedly increased.

When styrene oxide is employed, as preferred, for the esterification of the animal glue it may be added as a liquid to the aqueous solution of the glue and mixed therewith. The temperature at which the dissolved glue and styrene oxide react varies over a considerable range. The reaction can be carried out at room temperature (20° C.) or below, but to promote the rate of reaction it is preferred to heat the reactants to a temperature above 50° C. but below a temperature at which the glue tends to be degraded by the heat. Usually temperatures ranging from 50 to 80° C. are satisfactory.

Ethylene oxide and propylene oxide can also be reacted with the animal glue in a manner similar to styrene oxide, although it will usually be preferred to react ethylene oxide, as a gas. Temperatures ranging from 20 to 80° C. can be employed, although somewhat lower temperatures than for styrene oxide are preferred. Good results are obtained within the range of from 30 to 50° C.

Various grades of animal glues may be used in the preparation of our new glue compound. High, medium, or low grade glues derived from either hides or bones will serve with satisfactory results. For example, we may use high grade glues having a gel strength of around 500 or above, as well as medium grade glues having a gel strength in the neighborhood of 200.

By varying the weight ratio between the reactants (glue and alkylene oxide), it is possible to control the gel temperature of the glue product, as well as the increase of solubility of the glue product in water and in organic solvents. To illustrate this point, a higher percentage of styrene oxide will usually result in a lower gel temperature in the product. The solubility and gelling properties of animal glue have been found to be favorably modified when the amount of alkylene oxide chemically combined with the glue by the esterification reaction ranges from 10 to 30% by weight based on the dry glue starting material. However, it has been found desirable to employ an excess of the alkylene oxide reagent for the purpose of promoting the reaction. Specifically, it is preferred to contact the dissolved glue with from 20 to 100% by weight of the alkylene oxide based on the dry raw glue. Controlling the course of the reaction has not been found to be difficult since the percent of alkylene oxide combined with the blue tends to level off at about the amount which effects the most desirable modification in the gelling and solubility properties of the glue.

The time necessary to effect the desired reaction between the alkylene oxide and glue is dependent upon many factors including the kind and amount of reactants used, the amount of contact obtained between the reacting materials, etc., but it is largely dependent on the reaction temperature employed. This is illustrated by a comparison of the results of two experiments. In the first experiment the reaction was allowed to proceed at room temperature. After six weeks the gel temperature was found to be 17° C., and after three months the gel temperature had dropped to 8° C. In the second experiment the same reaction was allowed to proceed at 80° C. for seven hours following which the gel temperature of the product was 9° C. Therefore, we may say that the time required to react the components to the desired extent may vary between a few hours under certain conditions to several months under other conditions.

Our glue compound may be made in any convenient reaction vessel. It is advisable to use a means for agitating or stirring the reaction mixture. For use at elevated temperatures and especially with low boiling solvents, the reaction vessel may be fitted with a reflux column. However, it should be understood that the reaction may be carried out in any simple apparatus such as a bottle kept on a shelf at room temperature.

A desirable characteristic of our glue compound is high bond strength. For example, sanded maplewood blocks may be glued together with a solution of our glue and upon setting, the joint, broken with a hammer and chisel, has been found to give a wood failure of 100% while the bond remains intact.

Another advantage is that a liquid solution of our glue remains workable for long periods of time in an open pot. Such a solution may be dried as desired and then redissolved in a suitable solvent.

Our product is well adapted to the gluing and joining of furniture. It may be used to glue labels onto containers being held in cold storage. There are many other uses.

The modified glue product of this invention is particularly suitable for use as a liquid adhesive in either a water solution, an organic solvent solution, or a mixed water and organic solvent solution. As indicated previously, the animal glue which has been esterified with from 10 to 30% by weight of an alkylene oxide, such as ethylene oxide, propylene oxide or styrene oxide, is readily soluble in water and can even be dissolved in water at temperatures below 20° C. Therefore, after esterification the modified glue can be dried and then conveniently redissolved in water when it is desired to form the liquid adhesive. Because of the greatly increased water solubility of the esterified glue, aqueous solutions of the glue can be prepared with solids contents up to 70%, that is, up to 70 parts of the esterified glue may be dissolved in 30 parts by weight of water. For most purposes, it will be desirable to have the liquid adhesive contain from 30 to 70 parts of the esterified animal glue per each 100 parts of overall composition.

Animal glue esterified with styrene oxide has been found to have particularly desirable properties for use as a liquid adhesive in a water solution. The viscosity properties of styrene oxide-treated glue in a water solution are better than those for ethylene and propylene oxide-treated glues.

The esterified animal glue products of this invention have been found to be quite soluble in many organic solvents, especially in polar organic solvents, such as carbitol, dioxane, methyl Cellosolve, methanol, and ethylene chlorohydrin. This permits liquid adhesives to be prepared by dissolving the esterified glue in an organic polar solvent. While anhydrous polar solvents can be used, it will usually be desirable for the solvent to contain some water. Excellent liquid adhesives have been prepared using organic polar solvents containing not over 10% water. The liquid adhesives containing organic solvents have particular value where it is desired to prevent the adhesive coating from causing the coated object to curl, such as in the case of applying labels, etc. The presence of at least 25% by weight of an organic polar solvent in the solvent mixture in which the glue is dissolved is also of value in increasing the penetrating power of the glue in such applications as gluing wax-coated paper or cardboard. It has been found that the viscosity of the liquid glue prepared with any of the alkylene oxides is rendered more stable by acidifying the glue after the reaction is complete. The preferred pH range for storing the liquid glue ranges from pH 4 to pH 6.

This invention is further illustrated by the following specific examples:

*Example I*

50 grams of a dry 225 gel strength animal glue were added to 100 cc. of cold water and allowed to stand at room temperature for one hour. The mixture was then warmed in a 60° C. water bath until the glue went into solution. Thirty grams of styrene oxide were stirred into the solution and the reaction mixture refluxed with agitation at 80° C. for two hours, at which time the gel temperature of a sample was 18° C.; after refluxing at 80° C. for three hours the gel temperature was 14° C. and after refluxing at 80° C. for ten hours the gel temperature had dropped to −1° C.

*Example II*

50 grams of a dry 225 gel strength animal glue were added to 100 cc. of cold water and allowed to stand at room temperature for one hour. The mixture was then warmed in a 60° C. water bath until the glue went into solution. Fifteen grams of styrene oxide were stirred into the solution and reaction mixture refluxed with agitation at 80° C. for three hours, at which time the gel temperature was 17° C., and after refluxing at 80° C. for seven hours, the gel temperature was 9° C.

*Example III*

50 grams of a dry 225 gel strength animal glue were added to 100 cc. of cold water and allowed to stand at room temperature for one hour. The mixture was then warmed in a 60° C. water bath until the glue went into solution. Fifteen grams of sytrene oxide were stirred into the solution and the reaction mixture refluxed with agitation at 60° C. for fifteen hours at which time the gel temperature of a sample was 17° C.

*Example IV*

100 grams of a dry 225 gel strength animal glue were added to a mixture of 100 grams of styrene oxide in 10 cc. of cold water and the mixture refluxed with agitation for six hours at 75° C. The product was insoluble in water but did dissolve in ethylene chlorohydrin. A sample was placed in a deep freeze unit. The sample did not gel but did increase in viscosity at approximately −3° C.

*Example V*

200 grams of a dry 505 gel strength glue were added to 300 cc. of cold water and allowed to stand at room temperature for one hour. The mixture was then warmed in a 60° water bath until the glue dissolved in water. 60 grams of styrene oxide were stirred into the solution and the reaction mixture was agitated and refluxed at 65° C. for 17½ hours. At the end of this period a sample was withdrawn and the gel temperature determined to be 16° to 17° C.

An additional 10 grams of styrene oxide were added and the reaction mixture was agitated and refluxed at 65° C. for 6½ hours. At the end of this period the gel temperature was 9° C.

*Example VI*

A glue solution was prepared with 200 grams of a 176 jelly bone glue and 600 cc. of water. 100 grams of propylene oxide was added and the mixture was poured into a vessel fitted with an agitator and a reflux condenser. While agitating, the mixture was warmed at 60° C. for 9½ hours. The gelling temperature was now 6° C. and the pH had shifted from weakly acidic to 9.1. After drying in a vacuum flask the product weighed 246 grams which was an increase in weight of 23 percent.

A liquid adhesive was prepared by dissolving 50 grams of the propylene oxide-esterified glue as prepared above in 65 grams of methyl Cellosolve to give a solution having a suitable viscosity and a gel point below 0° C.

The methyl Cellosolve solution of the propylene oxide-glue was used to test this type of adhesive.

(1) Douglas fir blocks were glued and allowed to dry for several days. When the blocks were parted with a hammer and chisel, 100% wood failure was noted.

(2) When applied to a label there was no tendency for the edges of the paper to roll as normally occurs with water solutions of glue.

(3) The label was placed on a frosted tin can and adhered firmly when allowed to stand at room temperature.

(4) When a thin film was applied between two sheets of paper, the adhesive dried fast enough to cause the paper to tear when pulled apart.

*Example VII*

Using a propylene oxide-esterified animal glue prepared as described in Example VI, a number of solutions were prepared containing both water and an organic solvent. All solutions contained 40% of the esterified glue, 40% water, and 20% organic solvent. Tests on the gel temperatures of the liquid adhesive thus formed were made with the following results:

| Organic solvent: | Gelling temperature, ° C. |
| --- | --- |
| Carbitol | 13 |
| Dioxane | 9 |
| Methyl Cellosolve | 8 |
| Methanol | 6 |
| Ethylene chlorohydrin | 0 |

*Example VIII*

300 cc. of water was added to 200 grams of a hide glue having a jelly of 505, viscosity of 127, and pH 7.2. After warming into solution, 60 grams of styrene oxide was added and the mixture was warmed at 65° C. in a vessel fitted with an agitator and a reflux condenser. After 16½ hours of heating the gelling temperature was 16–17° C. Ten grams more of styrene oxide was added and the heating continued for 4½ hours. At this point the gelling temperature was 8° C. The product was dried in a vacuum flask. The dry weight was 242 grams or an increase of 21 percent. A 50 percent aqueous solution of this product had a pH of 8.0 and a gelling temperature of 9° C.

The styrene oxide-esterified glue prepared as just described was also used to prepare a liquid adhesive having an organic solvent instead of water. In preparing this adhesive, 50 grams of the esterified glue was dissolved in 150 grams of methyl Cellosolve. This solution had a gelling temperature of 17 to 18° C.

*Example IX*

In order to determine the effect of pH on the viscosity of liquid glue, a hide glue was prepared by the reaction with styrene oxide according to the method of Example VIII. This glue had a pH of 8 at the completion of the reaction. On storing a pH of 8 for four weeks, a sample (sample A) lost 20 to 25% of its viscosity. Another sample of the same liquid glue (sample B) was adjusted to a pH of 6. The viscosity of sample B decreased only 3% after four weeks storage under the same conditions as sample A.

In other experiments it was determined that the viscosity of any of the modified glues of this invention is more stable when the glue is acidified to a pH within the range of about 4 to 6.

*Example X*

The solutions of glue in aqueous organic solvents prepared as described in Example VII were tested as liquid adhesives to determine their penetrating power and adhesive qualities. Tests were made using wax-coated cardboard and gluing surfaces comparable with surfaces normally sealed by packaging machines. The surfaces were coated with the adhesive and put together with light pressure for 90 seconds before being allowed to dry. The bonds were slowly pulled apart to evaluate the adhesiveness of each formula. The most uniform and complete penetration of the wax coating was obtained with glue solutions containing dioxane or ethylene chlorohydrin. To further simulate machine packaging, a carton was filled with soap, the top was glued with the ethylene chlorohydrin formula, and the bottom with the dioxane formula. Light pressure was applied to these bonds for 90 seconds. The carton remained closed after the pressure was removed, and each adhesive dried to give a good seal.

*Example XI*

100 grams of a 225 gel hide glue was added to 300 ml. of cold water and allowed to stand at room temperature for one hour. The mixture was then warmed in a 60° C. water bath until the glue was in solution. Twenty grams of ethylene oxide was condensed into a liquid state. While agitating the glue solution at 50° C., the ethylene oxide was allowed to boil and the vapors passed into the glue solution. Two hours was required for the addition of the ethylene oxide. After completing the reaction the gelling temperature of the glue was 18–20° C.

*Example XII*

100 grams of a 495 gel hide glue was added to 300 cc. of cold water and after standing for an hour was warmed into solution by heating to 50° C. Fifty grams of condensed ethylene oxide was allowed to boil in a confined container and the vapors were passed into the agitated glue solution maintained at 50° C. After the reaction was complete the gelling temperature of the glue was 14–16° C.

Styrene oxide as a reagent in the process of this invention and the resulting styrene-oxide modified glue possess certain advantages among which are: (1) The higher B.P. (188–192° C.) of styrene oxide over the other epoxides gives it the advantage of a faster reaction rate due to its higher reaction temperature, 60–80° C., (2) the styrene oxide glue has a higher viscosity and maintains this high viscosity over long periods of standing, (3) the styrene oxide glue is self-preserved, (4) styrene oxide-glue is not affected by humidities which soften other glues.

While in the foregoing description we have set forth certain methods of practice, it will be understood that such methods may be modified widely by those skilled in the art without departing from the spirit of our invention.

We claim:

1. The method of modifying animal glue, characterized by the steps of forming an aqueous solution of animal glue at an acid pH so that the carboxyl groups of the glue are in their free acid form, introducing an alkylene oxide into the solution, and maintaining said alkylene oxide in contact with said glue for a time sufficient to lower the gel temperature of the glue.

2. The method of claim 1, in which said alkylene oxide is selected from the group consisting of styrene oxide, ethylene oxide, and propylene oxide, and in which the pH of said solution is below 6.5.

3. The method of modifying animal glue, characterized by the step of reacting animal glue in an aqueous solution under non-alkaline conditions with an alkylene oxide to esterify the glue, said animal glue containing carboxyl groups in free acid form.

4. The method step of claim 3, in which said alkylene oxide is selected from the group consisting of styrene oxide, ethylene oxide and propylene oxide.

5. The method of preparing liquid glue, which comprises dissolving non-alkaline animal glue in water and reacting said glue with styrene oxide at a temperature between about 50° to 80° C.

6. In the manufacture of liquid glue, the step of mixing together non-alkaline animal glue and styrene oxide for a time sufficient to cause a lowering in the gel temperature of said glue, said non-alkaline animal glue being dissolved in water.

7. In the manufacture of liquid glue, the steps of mixing together non-alkaline animal glue and an alkylene oxide selected from the group consisting of styrene oxide, ethylene oxide and propylene oxide for a time sufficient to cause a lowering in the gel temperature of said glue, said non-alkaline animal glue being dissolved in water, and adjusting said glue to a pH within the range of about 4 to 6.

8. The method of preparing liquid glue, which comprises dissolving non-alkaline animal glue in water and mixing said glue with styrene oxide in an amount from 20 to 100% by weight of said glue at temperature between about 50° to 80° C. for a time sufficient to cause a lowering in the gel temperature of said glue.

9. The method of preparing liquid glue which comprises dissolving non-alkaline animal glue in water and mixing said glue with styrene oxide in an amount from 20 to 100% by weight of said glue at temperatures between about 50° to 80° C. for a time sufficient to cause a lowering in the gel temperature of said glue and adjusting the pH of said glue to a pH approximately within the range of about 4 to 6 after the reaction is substantially complete.

10. As a new composition of matter, animal glue esterified in a non-alkaline aqueous reaction medium with from 10 to 30% by weight of an alkylene oxide selected from the group consisting of styrene oxide, ethylene oxide and propylene oxide, said esterified animal glue as compared with its properties prior to esterification being characterized by a reduced gelling temperature, by increased solubility in water, and by appreciable solubility in polar organic solvents.

11. As a new composition of matter, animal glue esterified in a non-alkaline aqueous reaction medium with from 10 to 30% by weight of an alkylene oxide selected from the group consisting of styrene oxide, ethylene oxide and propylene oxide, said esterified animal glue as compared with its properties prior to esterification being characterized by a reduced gelling temperature, by increased solubility in water, and by appreciable solubility in polar organic solvents, said esterified animal glue being adjusted to an acidic pH.

12. As a new composition of matter, animal glue esterified in a non-alkaline aqueous reaction medium with from 10 to 30% by weight of an alkylene oxide selected from the group consisting of styrene oxide, ethylene oxide and propylene oxide, said esterified animal glue as compared with its properties prior to esterification being characterized by a reduced gelling temperature, by increased solubility in water, and by appreciable solubility in polar organic solvents, said esterified animal glue being adjusted to an acidity within the pH range of 4 to 6.

13. A liquid adhesive, comprising an aqueous solution of esterified animal glue, wherein 100 parts of said solution contains from 30 to 70 parts of said glue, said glue being esterified in a non-alkaline aqueous reaction medium with from 10 to 30% by weight of styrene oxide.

14. A liquid adhesive, comprising an esterified animal glue dissolved in a mixture of water and an organic polar solvent, said mixture containing at least 25% by weight of said organic solvent, said animal glue being esterified with from 10 to 30% by weight of an alkylene oxide selected from the group consisting of styrene oxide, ethylene oxide, and propylene oxide.

15. A liquid adhesive, comprising an esterified animal glue dissolved in a mixture of water and an organic polar solvent, said mixture containing at least 25% by weight of said organic solvent, said animal glue being esterified with from 10 to 30% by weight of an alkylene oxide selected from the group consisting of styrene oxide, ethylene oxide, and propylene oxide, and said animal glue being within the pH range of from about 4 to 6.

16. A liquid adhesive, comprising esterified animal glue dissolved in an organic polar solvent containing less than 10% water by weight, said animal glue being esterified in a non-alkaline aqueous reaction medium with ethylene oxide.

17. A liquid adhesive, comprising esterified animal glue dissolved in an organic polar solvent containing less than 10% water by weight, said animal glue being esterified in a non-alkaline aqueous reaction medium with propylene oxide.

18. A liquid adhesive, comprising esterified animal glue dissolved in an organic polar solvent containing less than 10% water by weight, said animal glue being esterified in a non-alkaline aqueous reaction medium with styrene oxide.

19. A liquid adhesive, comprising esterified animal glue dissolved in an organic polar solvent containing less than 10% water by weight, said animal glue being esterified in a non-alkaline aqueous reaction medium with styrene oxide, said liquid adhesive being at an acid pH.

20. In the manufacture of liquid glue, the steps of mixing together non-alkaline animal glue and an alkylene oxide selected from the group consisting of styrene oxide, ethylene oxide and propylene oxide for a time sufficient to cause a lowering in the gel temperature of said glue, said non-alkaline animal glue being dissolved in water, and adjusting said glue to an acid pH after the manufacture thereof.

References Cited in the file of this patent

UNITED STATES PATENTS

| | | |
|---|---|---|
| 2,312,469 | Freund | Mar. 2, 1943 |
| 2,461,070 | McKinney | Feb. 8, 1949 |
| 2,622,069 | Monson | Dec. 16, 1952 |